(12) United States Patent
Nakata

(10) Patent No.: US 9,372,253 B2
(45) Date of Patent: Jun. 21, 2016

(54) WIRELESS POSITIONING APPARATUS

(71) Applicant: DENSO CORPORATION, Karyia, Aichi-pref. (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/608,320

(22) Filed: Jan. 29, 2015

(65) Prior Publication Data

US 2015/0219745 A1 Aug. 6, 2015

(30) Foreign Application Priority Data

Jan. 31, 2014 (JP) .................................. 2014-016992

(51) Int. Cl.
*G01S 5/00* (2006.01)
*G01S 5/02* (2010.01)
*G01C 21/00* (2006.01)

(52) U.S. Cl.
CPC ............. *G01S 5/0278* (2013.01); *G01S 5/0252* (2013.01); *G01S 5/0294* (2013.01)

(58) Field of Classification Search
USPC ................................................ 701/400, 408
See application file for complete search history.

(56) References Cited

U.S. PATENT DOCUMENTS

| 7,009,561 B2 * | 3/2006 | Menache ................ A63F 13/06 340/539.13 |
| 2005/0085257 A1 * | 4/2005 | Laird ....................... A61B 5/04 455/550.1 |
| 2011/0260913 A1 * | 10/2011 | Abraham .............. G01S 5/0036 342/357.25 |
| 2013/0310067 A1 | 11/2013 | Nakata et al. |

FOREIGN PATENT DOCUMENTS

JP 2013-257306 A 12/2013

* cited by examiner

*Primary Examiner* — Yonel Beaulieu
(74) *Attorney, Agent, or Firm* — Posz Law Group, PLC

(57) ABSTRACT

In a wireless positioning apparatus mounted in a moving body, feature point position information is stored in a reference trajectory storage, a reception state of transmitted waves from a wireless transmitter is detected, and a movement distance of the moving body is measured. A positioning trajectory is generated that indicates a correspondence relationship between the movement distance and the reception state of transmitted waves. A coincidence distribution is generated that indicates a correspondence between: a point on the reference trajectory to which a representative position, set arbitrarily within the positioning trajectory, corresponds for each coordinate shift value; and the degree of coincidence between the reference trajectory and the positioning trajectory. Based on the coincidence distribution, positioning information is generated. Reliability is determined based on an evaluation value reflecting a flatness of the coincidence distribution. The reliability serves as a determination criterion for determining whether or not the positioning information is used.

12 Claims, 12 Drawing Sheets

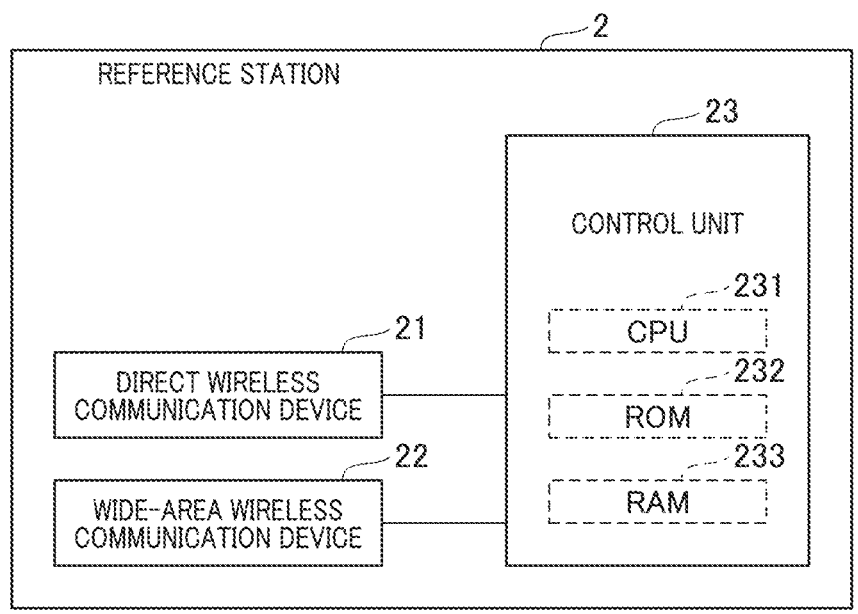
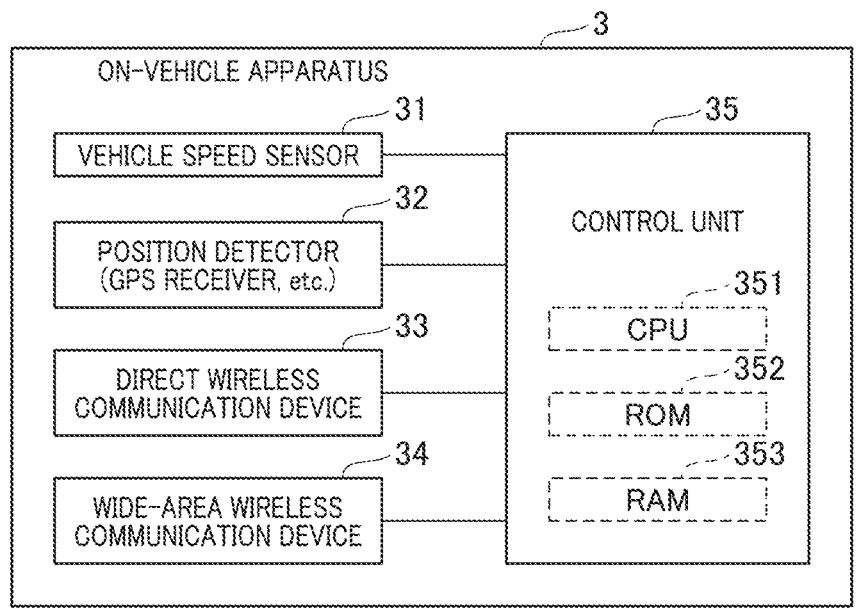

WIRELESS POSITIONING APPARATUS

CROSS-REFERENCE TO RELATED APPLICATION

This application is based on and claims the benefit of priority from Japanese Patent Application No. 2014-016992, filed Jan. 31, 2014, the disclosure of which is incorporated herein in its entirety by reference.

BACKGROUND

1. Technical Field

The present invention relates to a technology for performing positioning of a moving body using wireless communication.

2. Related Art

The global positioning system (GAPS) is well known as a wide-area positional information service provided to moving bodies such as vehicles. However, GAPS has a problem in that service is unavailable in the shadows of buildings and indoors. In addition, GAPS is dependent on infrastructure, that is, GAPS satellites. The positional information service becomes unavailable in the event of an infrastructure failure or disruption of service.

Another wireless positioning technology has been proposed (refer to, for example, US Patent Application Publication No. 2013/0310067). In this technology, a reference station is provided near a road (a predetermined path). A receiver is mounted in a moving body. The receiver receives transmission waves from the reference station. When the moving body moves along the predetermined path, a positioning trajectory is generated. The positioning trajectory indicates the changes in reception strength (received signal strength indicator (RSSI)) detected by the receiver. The positioning trajectory and a reference trajectory that is prepared in advance (a reference value for reception strength at each point on the predetermined path) are compared. The position of the moving body is estimated from the location at which the positioning trajectory and the reference trajectory most coincide.

A plurality of locations having a high degree of coincidence between the positioning trajectory and the reference trajectory may be present. Alternatively, there may be no location that can be said to have an obviously higher degree of coincidence compared to other locations. In such instances, the location having the highest value of the degree of coincidence may not necessarily indicate the correct position. Therefore, in such instances, when the positioning result is determined from the location at which the degree of coincidence is the highest, as in the conventional technology, a problem occurs in that whether or not the positioning result is reliable cannot be determined.

SUMMARY

It is thus desired to provide a technology for evaluating the reliability of wireless positioning.

An exemplary embodiment of the present disclosure provides a wireless positioning apparatus that is mounted in a moving body and includes reference trajectory storage means (reference trajectory storage), reception state detecting means (reception state detector), distance measuring means (distance measuring unit), positioning trajectory generating means (positioning trajectory generator), distribution generating means (distribution generator), positioning information generating means (positioning information generator), and reliability calculating means (reliability calculator).

The reference trajectory storage stores therein feature point position information. The feature point position information indicates, on a positioning coordinate system, a reference trajectory and a position on a designated path, set in advance, corresponding to one or more feature points present on the reference trajectory. The reference trajectory indicates a correspondence relationship between a position on the designated path and a reception state of transmitted waves from a wireless transmitter that is set so as to surround the designated path with a communication area of the wireless transmitter.

The reception state detector detects the reception state of the transmitted waves from the wireless transmitter.

The distance measuring unit measures a movement distance of the moving body.

The positioning trajectory generator generates a positioning trajectory that indicates a correspondence relationship between the movement distance measured by the distance measuring unit and the reception state of the transmission waves detected by the reception state detector.

The distribution generator adds positions (elements) of the movement distance of the positioning trajectory to the same coordinate shift value. The distance obtained through addition of the coordinate shift value is related to a position on the designated path of the reference trajectory. The distribution generator thereby calculates a degree of coincidence between the positioning trajectory and the reference trajectory.

Furthermore, the distribution generator calculates the degree of coincidence for differing coordinate shift values within a predetermined area, or in other words, calculates the degree of coincidence for each coordinate shift value, thereby acquiring correspondence between the degree of coincidence and each coordinate shift value.

In addition, a representative position (element) is set arbitrarily within the positioning trajectory. The distribution generator generates a coincidence distribution that indicates the correspondence between a point on the reference trajectory to which the representative position corresponds for each coordinate shift value and the degree of coincidence between the reference trajectory and the positioning trajectory.

The positioning information generator generates positioning information corresponding to the representative position from the feature point position information and a difference between an arbitrary feature point and a maximum coincidence point in terms of positions on the designated path. The maximum coincidence point refers to a point in the coincidence distribution at which the degree of coincidence is the highest.

The reliability calculator determines reliability using an evaluation value. The evaluation value is a value reflecting a flatness of the coincidence distribution. The reliability serves as a determination criterion for determining whether or not the positioning information is to be used.

For example, the reliability calculator may use, as the evaluation value, at least one of: i) a maximum value of the degree of coincidence in the coincidence distribution, and ii) a maximum value of a distance between: a point at which the degree of coincidence is the maximum value; and a point at which the difference with or ratio to the maximum value of the degree of coincidence is below a predetermined upper limit value.

In the wireless positioning apparatus of the present disclosure, configured as described above, the reliability of the positioning information that has been generated based on the maximum coincidence point can be evaluated using an evaluation value. As a result, when reliability is low, for example, generation or usage of the positioning information can be prohibited. As a result, the occurrence of malfunction in various types of control that use the positioning information can be suppressed.

In addition, in addition to the above-described wireless positioning apparatus, the present disclosure can be actualized by various aspects, such as a system that uses the wireless positioning apparatus as a constituent element, a program for enabling a computer to function as the wireless positioning apparatus, or a reliability evaluation method for wireless positioning.

BRIEF DESCRIPTION OF THE DRAWINGS

In the accompanying drawings:

FIG. 2 is a block diagram of a configuration of a reference station;

FIG. 3 is a block diagram of a configuration of an on-vehicle apparatus;

DESCRIPTION OF EMBODIMENTS

Embodiments to which the present disclosure is applied are hereinafter described with reference to the drawings.

First Embodiment

<Overall Configuration>

Figure 1:
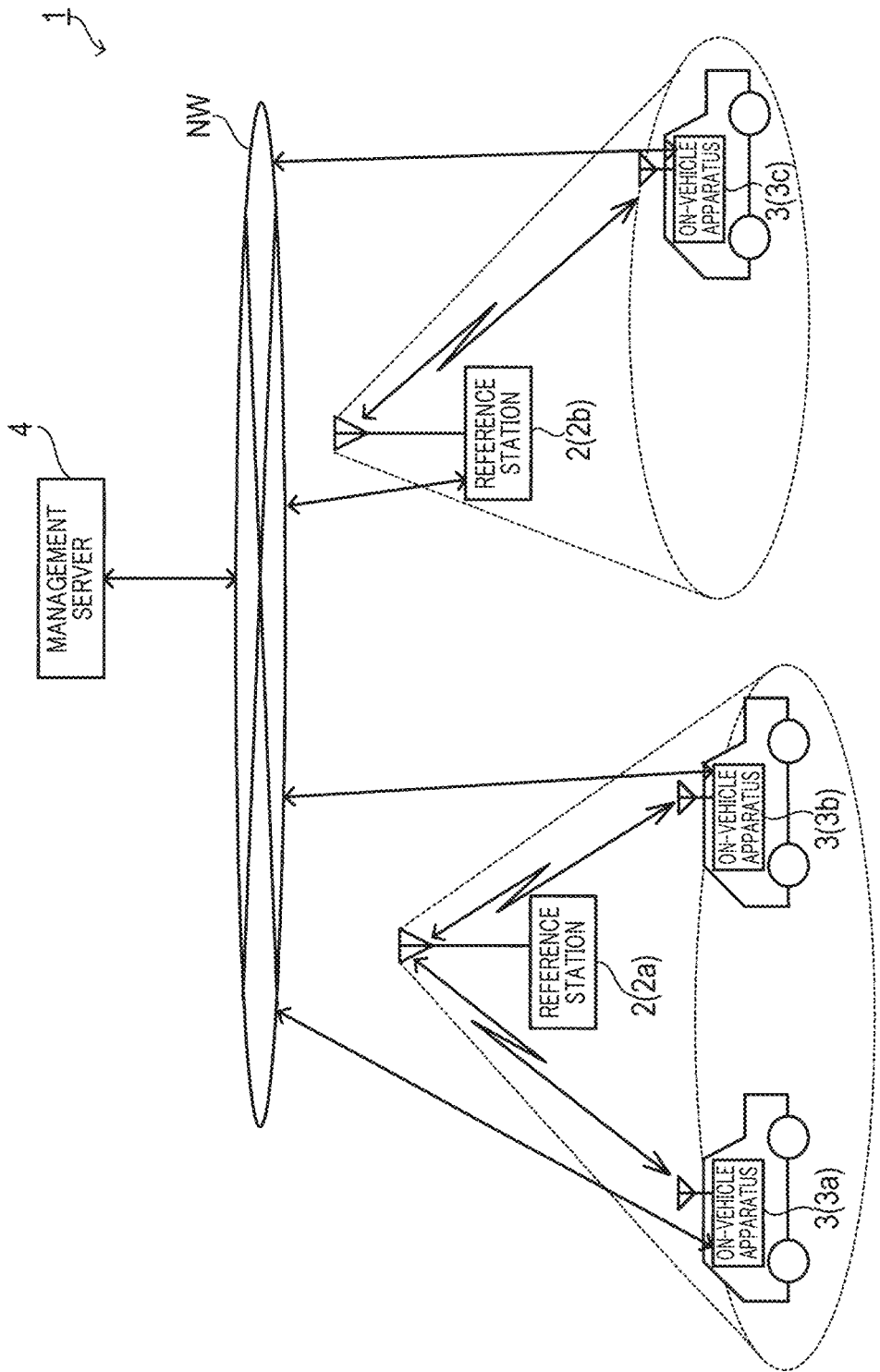
FIG. 1 is an explanatory diagram of an overall configuration of a wireless positioning system according to a first embodiment.

As shown in FIG. 1, a wireless positioning system 1 according to the present embodiment is configured by a plurality of reference stations 2 (shown in FIG. 1 as two reference stations 2a and 2b), an on-vehicle apparatus 3 (shown in FIG. 1 as three on-vehicle apparatuses 3a, 3b, and 3c), and a management server 4. The plurality of reference stations 2 are set so as to be dispersed within an area outside of GAPS range. The reference stations 2 each perform wireless communication within a predetermined area. The on-vehicle apparatus 3 is mounted in an automobile (vehicle) and performs wireless positioning using wireless communication with the reference stations 2. The management server 4 manages data required by the on-vehicle apparatus 3 when performing wireless positioning.

Of the plurality of reference stations 2a and 2b, some reference stations (reference station 2b in FIG. 1) are configured to be capable of data communication with the management server 4 via a wide-area wireless communication network NW (such as a mobile phone communication network). The reference stations 2 are disposed so that respective communication areas do not overlap with one another. The distance between respective communication areas is set so as to be a distance equal to or shorter than a distance enabling sufficiently accurate interpolation of positioning results obtained within the communication areas through autonomous positioning performed using only information obtained within each vehicle. The reference stations 2 may also be disposed so that portions of respective communication areas overlap with one another.

<Reference Station>

As shown in FIG. 2, the reference station 2 includes a direct wireless communication device 21, a wide-area wireless communication device 22, and a control unit 23.

The direct wireless communication device 21 performs wireless communication (also referred to, hereinafter, as "direct wireless communication") with the on-vehicle apparatus 3.

The wide-area wireless communication device 22 performs data communication with the management server 4 via the wide-area wireless communication network NW. However, of the reference stations 2a and 2b, only the reference station 2b is provided with the wide-area wireless communication device 22. The wide-area wireless communication device 22 is omitted in the reference station 2a.

The control unit 23 includes a central processing unit (CPU) 231, a read-only memory (ROM) 232, and a random access memory (RAM) 233. The CPU 231 performs processes based on programs stored in the ROM 232. Specifically, the CPU 231 performs at least a beacon transmission process. In the beacon transmission process, a road present within the communication range of the direct wireless communication device 21 is set as a designated path. The CPU 231 periodically transmits a wireless beacon using the direct wireless communication device 21 to an automobile traveling on the designated path. The wireless beacon includes identification information of the own reference station 2.

<On-Vehicle Apparatus>

As shown in FIG. 3, the on-vehicle apparatus 3 includes a vehicle speed sensor 31, a position detector 32, a direction wireless communication unit 33, a wide-area wireless communication device 34, and a control unit 35.

The vehicle speed sensor 31 detects the speed of a vehicle in which the vehicle speed sensor 31 is mounted. The detection result from the vehicle speed sensor 31 is then inputted to the control unit 35.

The position detector 32 is configured by a GAPS receiver and sensors including at least a distance sensor and an orientation sensor. The GAPS receiver receives satellite signals from GAPS satellites. The distance senor detects the traveling distance of the own vehicle based on the rotation of the tires. The position detector 32 detects the position and advancing direction of the own vehicle based on the signals obtained from the sensors. The detection results from the position detector 32 are inputted to the control unit 35.

The direct wireless communication device 33 performs direct wireless communication with the reference station 2.

The wide-area wireless communication device 34 performs data communication with the management server 4 via the wide-area wireless communication network NW.

The control unit 35 includes a CPU 351, a ROM 352, and a RAM 353. The CPU 352 performs processes based on programs stored in the ROM 352. Specifically, the CPU 351 performs at least a position estimation process (described hereafter). In the position estimation process, the CPU 351 estimates the position of the own vehicle by wireless positioning using information acquired through wireless communication via the communication units 33 and 34.

<Management Server>

Figure 4:
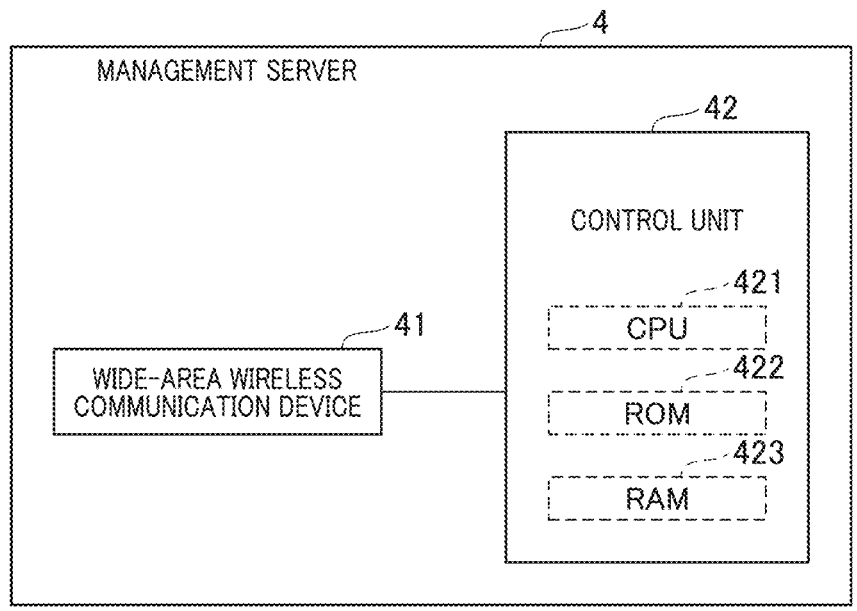
FIG. 4 is a block diagram of a configuration of a management server.

As shown in FIG. 4, the management server 4 includes a wide-area wireless communication device 41 and a control unit 42. The wide-area wireless communication device 41 performs data communication with the reference station 2 and the on-vehicle apparatus 3 via the wide-area wireless communication network NW. In addition, the control unit 42 includes a CPU 421, a ROM 422, and a RAM 423. The CPU 421 performs processes based on programs stored in the ROM 422. Specifically, the CPU 421 performs at least an information update process and an information provision process. In the information update process, the CPU 421 updates reference trajectory information based on information collected from the reference station 2 via the wide-area wireless communication device 41. In the information provision process, the CPU 421 provides the reference trajectory information in response to a request from the on-vehicle apparatus 3 via the wide-area wireless communication device 41.

Figure 5:
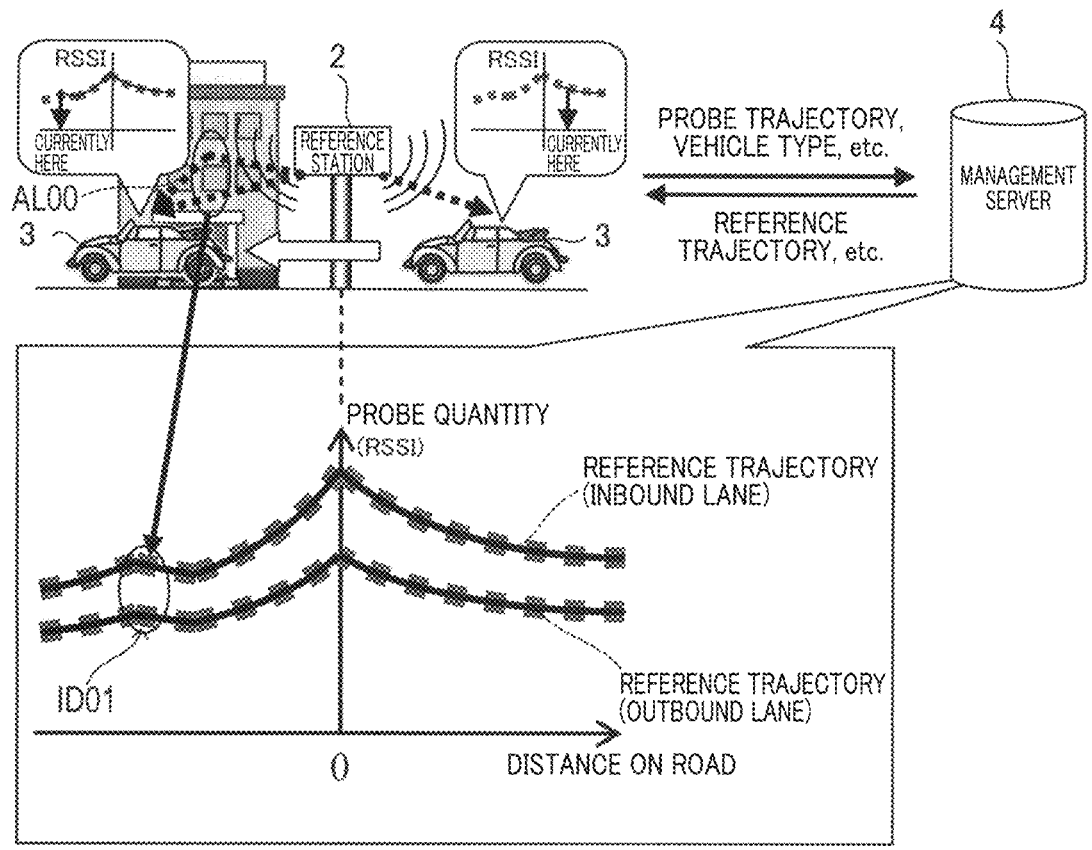
FIG. 5 is an explanatory diagram of a reference trajectory.

In addition, the RAM 423 stores therein the reference trajectory information related to each of the plurality of reference stations 2. The reference trajectory information includes at least a reference trajectory and feature point information. The reference trajectory indicates probe quantities (the reception signal strength RSSI of a wireless signal received by the on-vehicle apparatus 3 from a wireless station, according to the present embodiment) of the wireless beacon related to a reference station 2 in association with a movement distance p from a base point along the designated path. The base point is set to a point on the designated path that is closest to the reference station 2. The probe quantity is detected at each point on the designated path. As shown in FIG. 5, in the reference trajectory, the probe quantity is ordinarily the highest at the base point (the point where p=0).

However, the probe quantity does not necessarily monotonically decrease as the point moves farther from the base point. The reference trajectory may have a local maximum point (see indicator ID01 in FIG. 5) that is caused by reflection, diffraction, or the like from surrounding buildings (see arrow AL00 in FIG. 5). In addition, the base point and local maximum points such as these are referred to as feature points of the reference trajectory. The positions on the designated path corresponding to the base point and local maximum points are referred to as feature point positions. The feature point position information refers to the feature point positions expressed by positioning coordinates.

The reference trajectory is prepared for each type of vehicle (vehicle type). In addition, when the designated path is composed of a plurality of traffic lanes (such as an inbound lane and an outbound lane), the reference trajectory is prepared for each lane. Ordinarily, the reference trajectory of the lanes configuring the same designated path are substantially similar in shape. The probe quantity in the reference trajectory of the lane closer to the reference station indicates a higher value.

<Position Estimation Process>

Here, the steps in the position estimation process performed by the CPU 351 of the on-vehicle apparatus 3 will be described with reference to FIG. 6. The position estimation process is repeatedly performed while the CPU 351 is operating.

When the position estimation process is performed, first, at step S10, the CPU 351 determines whether or not the on-vehicle apparatus 3 is connected to the management server 4 in a communicable state by the wide-area wireless communication device 34. Here, when determined that the on-vehicle apparatus 3 and the management server 4 are not connected (NO at step S10), the CPU 351 proceeds to step S40.

On the other hand, when determined that the on-vehicle apparatus 3 is connected to the management server 4 (YES at step S10), at step S20, when a positioning trajectory that has not been transmitted to the management server 4 is present, the CPU 351 transmits positioning trajectory information to the management server 4. The positioning trajectory information is composed of the untransmitted positioning trajectory that has been generated in a process described hereafter and identification information of the reference station 2 extracted from transmission waves received when generating the positioning trajectory. The positioning trajectory information also includes information indicating the vehicle type, the advancing direction of the own vehicle, the current time, and the like.

At subsequent step S30, the CPU 351 acquires reference trajectory information from the management server 4. The reference trajectory information includes at least the reference trajectory of a reference station 2 that is present near the road on which the own vehicle is traveling. The reference station 2 is present within a distance (such as 1 km, according to the present embodiment) set in advance from the current position of the own vehicle.

The CPU 351 stores the reference trajectory information in the RAM 353 and proceeds to step S40. At this time, the CPU 351 is merely required to store, in the RAM 353, the information related to the reference trajectory generated for the vehicle type of the own vehicle. Furthermore, the CPU 351 may store only information related to the reference trajectory generated for the lane matching the advancing direction of the own vehicle. When the reference trajectory information of the subject reference station 2 is already stored in the RAM 353 and the information clearly matches the information stored in the management server 4 (in other words, the information has not been updated after acquisition), the reference trajectory information is not required to be acquired again.

At step S40, the CPU 351 determines whether or not the direct wireless communication device 33 has detected a wireless beacon. Here, when determined that the wireless beacon has not been detected (NO at step S40), the CPU 351 temporarily ends the position estimation process.

On the other hand, when determined that the wireless beacon has been detected (YES at step S40), at step S50, the CPU 351 detects the probe quantity (the reception signal strength RSSI, according to the present embodiment) of the detected wireless beacon. In addition, at step S60, the CPU 351 calculates the movement distance (referred to, hereinafter, as a probe movement distance) of the own vehicle from the point at which the wireless beacon has initially been detected.

Then, at step S70, the CPU 351 adds the probe quantity and probe movement distance pair to the positioning trajectory. The CPU 351 thereby creates a positioning trajectory that indicates the correspondence relationship between the probe quantity and the probe movement distance from the point at which the wireless beacon has initially been detected to the current point.

Figure 7:
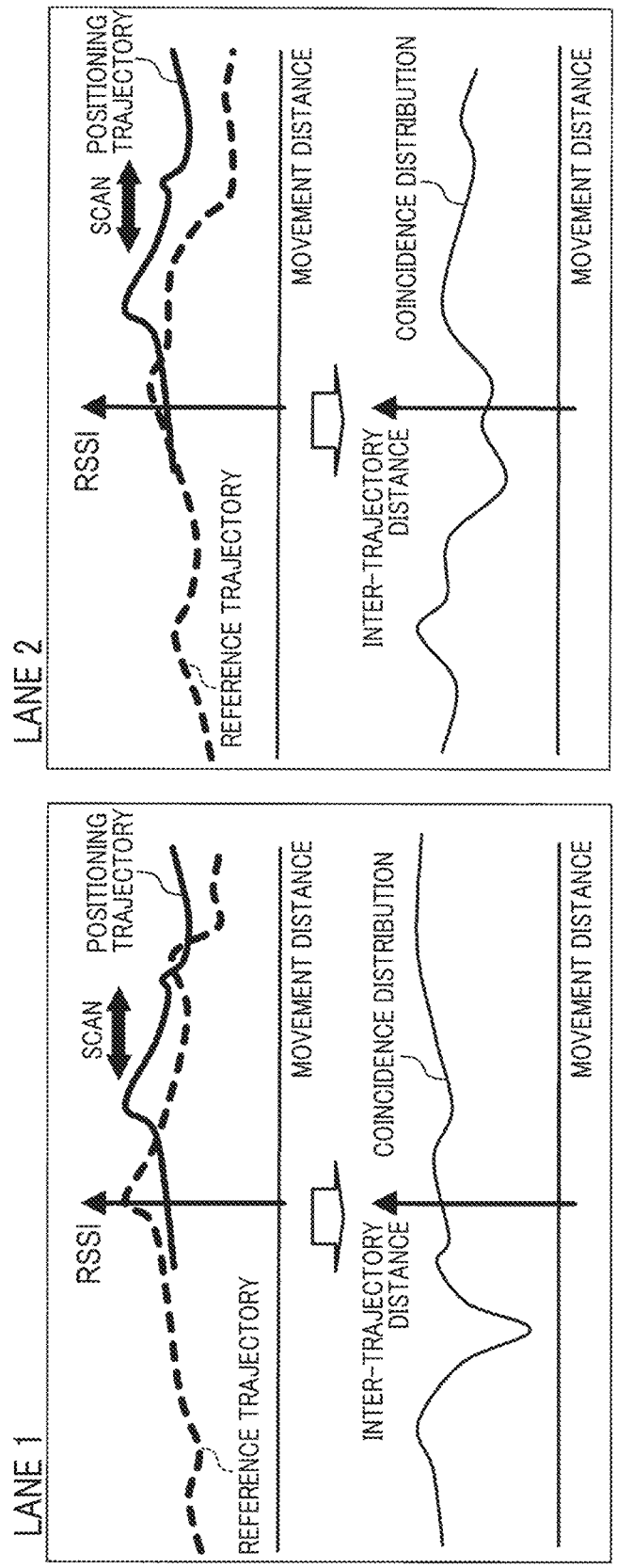
FIG. 7 is an explanatory diagram of a position estimation method using the reference trajectory and a positioning trajectory.

As shown in FIG. 7, a function is provided for calculating the degree of coincidence between the positioning trajectory and the reference trajectory. Here, the reference trajectory for each lane acquired at step S30 is used. The same coordinate shift value is added to positions (elements) of the distance in the positioning trajectory created at step S70. The obtained positions of the distance through addition of the coordinate shift value are related to positions on the designated path of the reference trajectory.

At subsequent step S80, the CPU 351 scans each reference trajectory for differing coordinate shift values within a predetermined area and calculates a degree of coincidence between the positioning trajectory and the reference trajectory. The CPU 351 thereby acquires correspondence of the degree of coincidence with the coordinate shift value. In addition, a representative position (element) is arbitrarily set within the positioning trajectory. The CPU 351 creates a coincidence distribution that indicates a correspondence between: a point on the reference trajectory to which the representative position corresponds for each coordinate shift value; and the degree of coincidence between the reference trajectory and the positioning trajectory.

FIG. 7 shows an instance in which the designated path is composed of two lanes. In addition, an inter-trajectory distance between the reference trajectory and the positioning trajectory is used as a parameter that indicates the degree of coincidence. In other words, the degree of coincidence is determined to be higher as the inter-trajectory distance (the value of the vertical axis in the coincidence distribution) becomes shorter.

At subsequent step S90, the CPU 351 calculates reliability R for each lane using the following expression (1), based on the coincidence distribution generated for each lane at step S80.

$$R = \frac{A}{m[p] \times w[d]} \quad (1)$$

Figure 8:
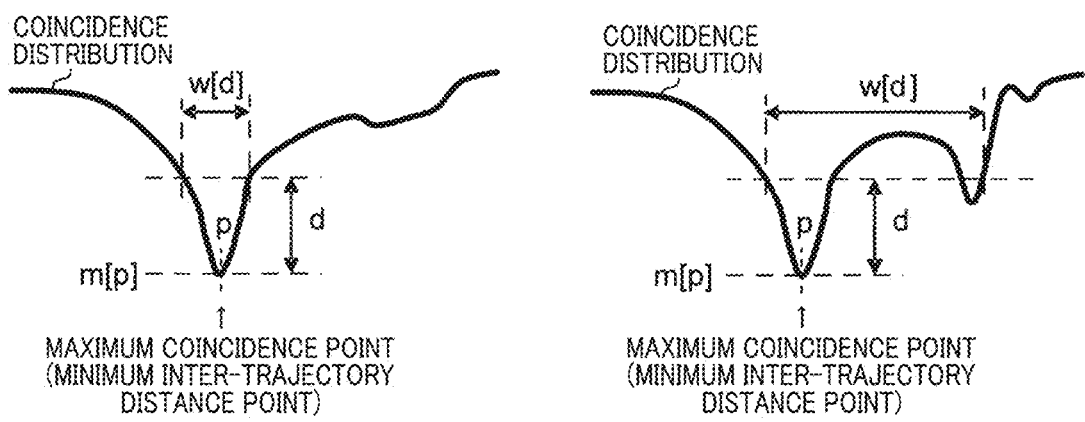
FIG. 8 is an explanatory diagram of a method for calculating reliability.

Here, as shown in FIG. 8; p represents a movement distance (the distance from the base point to a maximum coincidence point) that specifies the maximum coincidence point that is the point on the designated path at which the degree of coincidence is the highest (the inter-trajectory distance is the shortest); m[p] represents the inter-trajectory distance at the maximum coincidence point; d represents a reference value that indicates an allowable range of variation in the degree of coincidence (inter-trajectory distance); wild[d] represents the width between points that are the farthest apart, among the points within the coincidence distribution at which the inter-trajectory distance is m[p]+d; and A represents a constant of proportionality. In other words, in the expression (1), m[p] and w[d] are used as evaluation values. The expression (1) calculates reliability R based on these evaluation values.

Hereafter, the lane having the highest calculated reliability R is referred to as a target lane. In other words, in FIG. 7, the reliability R of lane 1 determined from the coincidence distribution is a higher value. Therefore, the lane 1 is the target lane.

Figure 9:
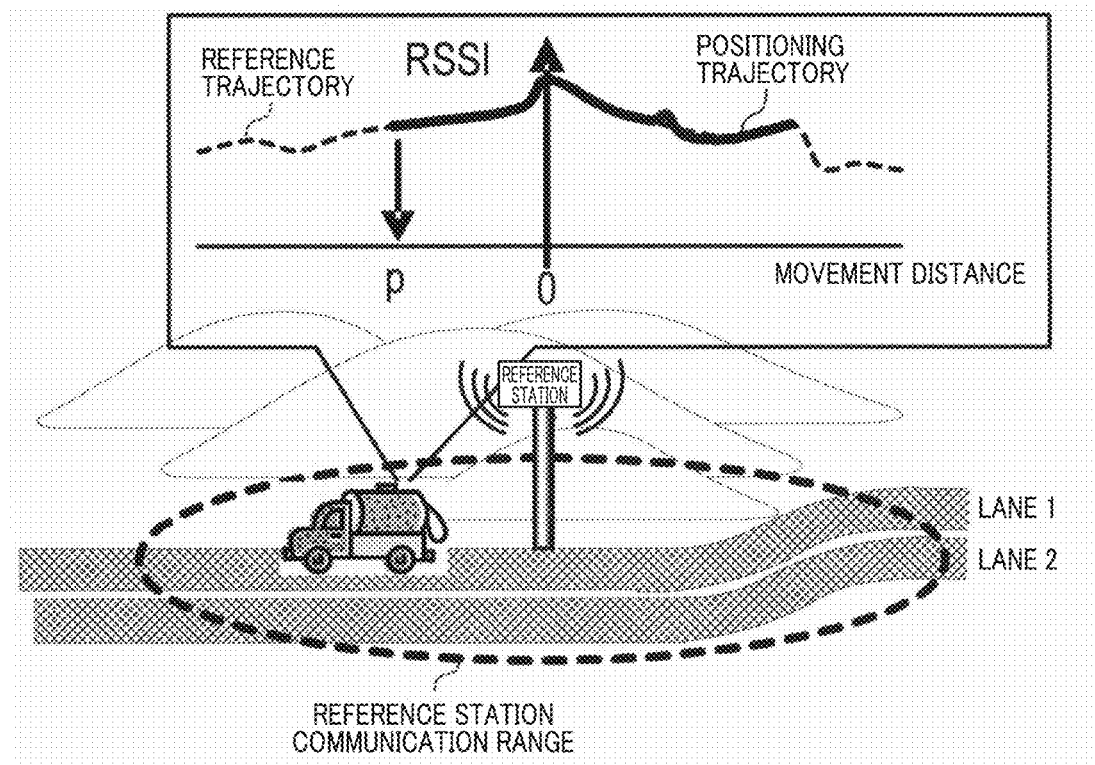
FIG. 9 is an explanatory diagram of an overview of position estimation.

As shown in FIG. 9, these results indicate that, when presumed that the own vehicle is positioned at a point on the lane 1 that is apart from the base point by the movement distance p, the degree of coincidence between the reference trajectory and the positioning trajectory is the highest. In other words, the point that has moved from the point on the designated path corresponding to the base point by the movement distance p along the designated path can be estimated to be the current position of the own vehicle.

At step S100, the CPU 351 determines whether or not the reliability R of the target lane determined at step S90 is higher than a threshold that has been set in advance. When determined that the reliability R of the target lane is the threshold or lower (NO at step S100), the CPU 351 temporarily ends the position estimation process.

On the other hand, when determined that the reliability R of the target lane is higher than the threshold (YES at step S100), at step S110, the CPU 351 generates the positioning information based on the target lane and the movement distance p from the maximum coincidence point detected for the target lane. The CPU 351 then temporarily ends the position estimation process.

The positioning information is composed of positioning coordinates and lane information. The positioning coordinates indicate the current position of the own vehicle. The lane information indicates the lane in which the own vehicle is traveling. The positioning coordinates are determined based on the coordinates of a point moved by the movement distance p in the advancing direction of the own vehicle along the designated path from the point on the designated path corresponding to the base point.

In addition, the positioning coordinates are determined based on the coordinates on the designated path corresponding to the base point on the coincidence distribution, or in other words, the feature point position coordinates (refer to step S30) acquired from the management server 4. The positioning coordinates are also determined based on the movement distance p to the maximum coincidence point. The target lane is set as the lane information.

The positioning information generated as described above is used in various types of control that use positional information of the own vehicle.

At foregoing step S20, the management server 4 performs a trajectory update process. In the trajectory update process, the management server 4 updates the reference trajectory based on the positioning trajectory information transmitted to the management server 4 from the on-vehicle apparatus 3. In the trajectory update process, the management server 4 stores the positioning trajectory included in the acquired positioning trajectory information so as to classify the positioning trajectory into identification information of the reference station 2, the type of vehicle, or the advancing direction of the vehicle. The management server 4 then calculates an average value of the positioning trajectories for the classified positioning trajectories. The management server 4 updates the reference trajectory stored therein based on the calculation results.

When determining the average value of the positioning trajectories, when a positioning trajectory of which the dispersion is equal to or higher than an elimination determination value that is set in advance is present among the accumulated positioning trajectories, the positioning trajectory may be omitted when determining the average value.

The on-vehicle apparatus 1 of the wireless positioning system 1, configured as described above, generates the positioning information based on the maximum coincidence point. The maximum coincidence point is extracted through comparison of the positioning trajectory and the reference trajectory.

In addition, the on-vehicle apparatus 1 determines the reliability R of the positioning information using the evaluation values m[p] and w[d]. The evaluation values m[p] and w[d] evaluate the shape (flatness) of the coincidence distribution. The reliability R decreases when a plurality of local maximum points of the degree of coincidence (local minimum points of the inter-trajectory distance) are present in the coincidence distribution, or when only a low degree of coincidence can be obtained as a whole.

Therefore, for example, as a result of the positioning information being prohibited from being generated or used based on the reliability R, the occurrence of malfunction during the various types of control that use the positioning information can be suppressed.

According to the present embodiment, the trajectory length of the positioning trajectory successively increases based on the traveling of the vehicle. The trajectory length at the point at which the reliability R exceeds the threshold may be maintained. Subsequent processing may then be performed. In this instance, processing subsequent to the point at which the reliability R exceeds the threshold can be reduced.

Second Embodiment

The basic configuration according to a second embodiment is similar to that according to the first embodiment. Descriptions of common configurations are omitted. Differences will mainly be described.

According to the above-described first embodiment, as a result of the position estimation process, the trajectory length of the positioning trajectory successively increases based on the traveling of the vehicle.

Conversely, the present embodiment differs from the first embodiment in that the information provided from the management server 4 to the on-vehicle apparatus 3 includes a measurement result usability condition set. The measurement result usability condition set prescribes the trajectory length. The trajectory length of the positioning trajectory is restricted to a length prescribed by the measurement result usability condition set. In addition, the management server performs a measurement result usability condition set update process (hereinafter referred to as an "update process") in addition to the trajectory update process.

<Measurement Result Usability Condition Set Update Process>

Figure 10:
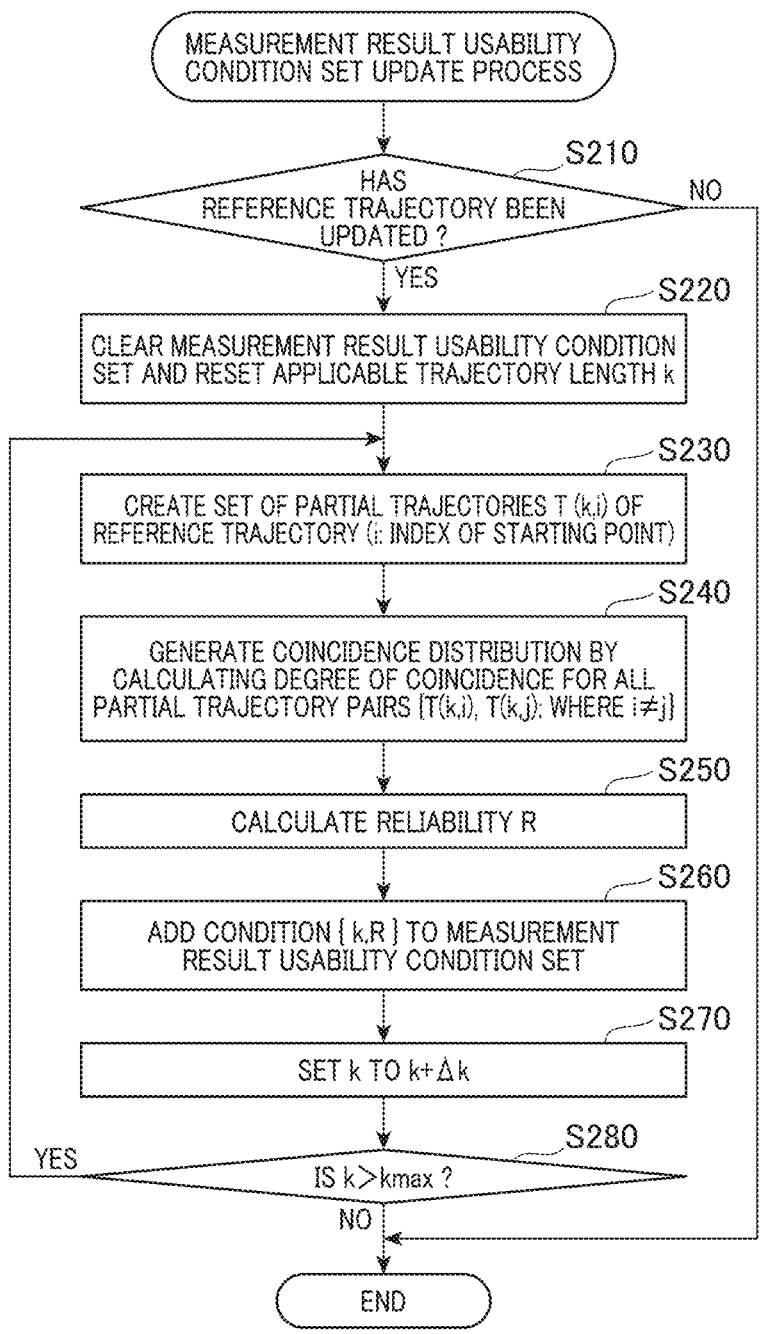
FIG. 10 is a flowchart of a measurement result usability condition set update process performed by an on-vehicle apparatus in a wireless positioning system according to a second embodiment.

First, the steps in the update process performed by the CPU 421 of the management server 4 will be described with reference to FIG. 10. The update process is repeatedly performed while the CPU 421 is operating.

When the update process is performed, first, at step S210, the CPU 421 determines whether or not the reference trajectory has been updated by the trajectory update process that is performed separately. When determined that the reference trajectory has not been updated (NO at step S210), the CPU 421 temporarily ends the process.

On the other hand, when determined that the reference trajectory has been updated (YES at step S210), at step S220, the CPU 421 clears a measurement result usability condition set that is related to the updated reference trajectory. The CPU 421 resets an applicable trajectory length k to an initial value that is set in advance. The reference trajectory is composed of a plurality of pieces of data D1 to Dn. The plurality of pieces of data D1 to Dn correspond to points on the designated path. The initial value of the applicable trajectory length k is merely required to be a length equivalent to two pieces of data or longer and shorter than the overall length of the reference trajectory.

At subsequent step S230, the CPU 421 generates a set of partial trajectories T(k,i) from the updated reference trajectory (hereinafter referred to as a "target reference trajectory"). The set of partial trajectories T has a length that is the applicable trajectory length k. The starting point of the set of partial trajectories T is any data Di configuring the reference trajectory.

At subsequent step S240, the CPU 421 uses the partial trajectories generated at step S230 to generate a coincidence distribution. The CPU 421 generates the coincidence distribution by calculating the degree of coincidence (inter-trajectory distance) for all partial trajectory pairs {T(k,i), T(k,j); where i≠j}.

At subsequent step S250, the CPU 421 calculates the reliability R using the coincidence distribution generated at step S240.

At subsequent step S260, the CPU 421 adds a condition {k,R} to the measurement result usability condition set. The condition {k,R} indicates that the reliability of the positioning information that is obtained when the trajectory length of the positioning trajectory is k, when wireless positioning using the target reference trajectory is performed, is R.

At subsequent step S270, the CPU 421 sets a new trajectory length k that is a trajectory length obtained by increasing the applicable trajectory length k by a predetermined value Δk. At subsequent step S280, the CPU 421 determines whether or not the applicable trajectory length k is longer than an upper limit value kmax (≤overall length of the target reference trajectory). When determined that the applicable trajectory length k is the upper limit value kmax or shorter (NO at step S280), the CPU 421 returns to step S230 and repeatedly performs the above-described process. On the other hand, when determined that the applicable trajectory length k is longer than the upper limit value kmax (YES at step S280), the CPU 421 temporarily ends the process.

Here, in addition to the condition related to the applicable trajectory length k, a condition that the reliability R is a predetermined value or higher may be added to the condition for ending the process at step S280.

Figure 11:
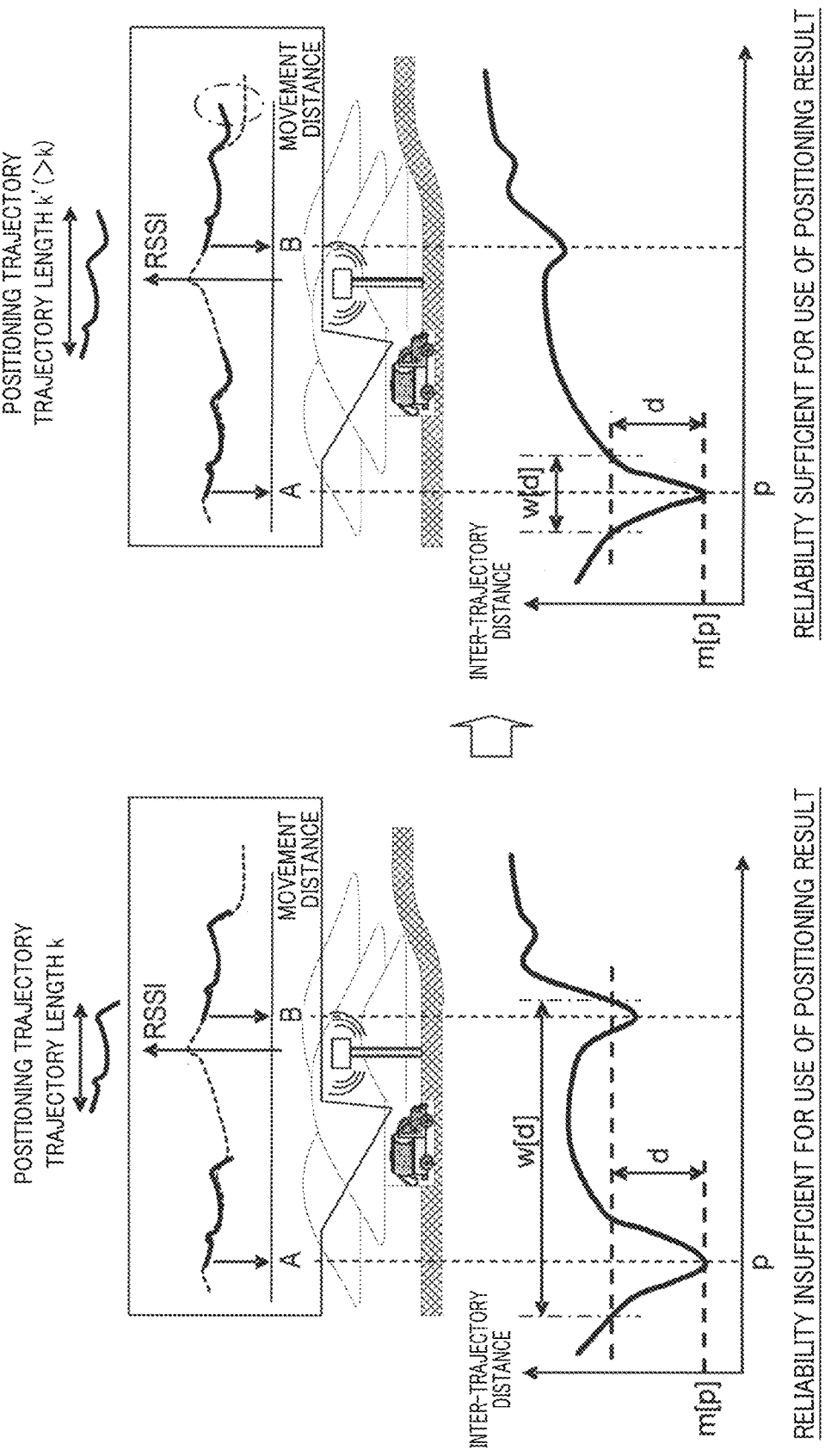
FIG. 11 is an explanatory diagram of a method for setting a measurement result usability condition.

As shown in FIG. 11, even when the same reference trajectory is used, the shape of the coincidence distribution varies depending on the trajectory length of the positioning trajectory that is used. The timing at which the positioning information is outputted becomes earlier as the trajectory length becomes shorter. However, portions in which a high degree of coincidence can be obtained are easily detected in a plurality of locations. The reliability of the positioning information decreases.

In addition, the reliability of the positioning information increases as the trajectory length increases. However, the timing at which the positioning information is outputted becomes later. In other words, the measurement result usability condition indicates the relationship between the reliability and the output timing of the positioning information. The measurement result usability condition is used to enable selection of the capabilities of the positioning information as required.

<Position Estimation Process>

Figure 12:
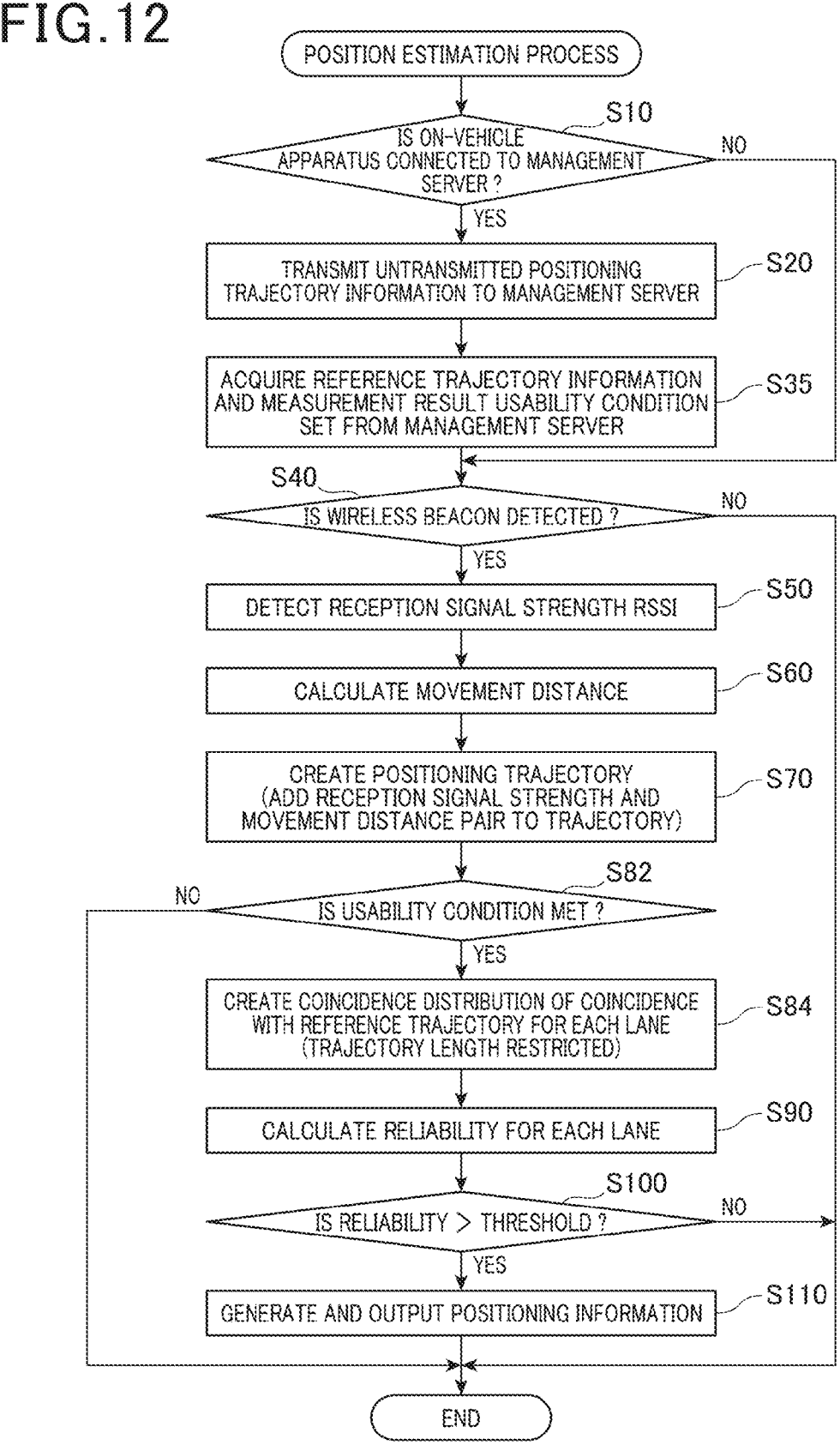
FIG. 12 is a flowchart of a position estimation process performed by the on-vehicle apparatus in the wireless positioning system according to the second embodiment.

Next, the steps in the position estimation process performed by the CPU 351 of the on-vehicle apparatus 3 will be described with reference to FIG. 12. The position estimation process according to the second embodiment is similar to the position estimation process according to the first embodiment, aside from step S35 being performed instead of step S30 and step S82 and step S84 being performed instead of step S80 when the details in FIG. 12 are compared with those in FIG. 6. Therefore, the differences will mainly be described.

According to the present embodiment, the required reliability RQ is set in advance. The required reliability RQ indicates the minimum reliability required of the positioning information obtained through wireless positioning. Here, the required reliability RQ may be a fixed value. Alternatively, the required reliability RQ may be a value that dynamically changes depending on the type of control that is running and uses the positioning information, and the like.

As shown in FIG. 12, at step S35, the CPU 351 of the on-vehicle apparatus 3 acquires, in addition to the reference trajectory information, the measurement result usability condition set related to the reference trajectory information from the management server 4.

In addition, at step S82, the CPU 351 determines whether or not the measurement result usability condition is met. Specifically, the CPU 351 determines whether or not the positioning trajectory generated at step S70 has reached the applicable trajectory length k corresponding to the required reliability RQ, based on a measurement result usability condition {k,RQ} corresponding to the required reliability RQ. When determined that the measurement result usability condition is not met (NO at step S82), the CPU 351 temporarily ends the process. When determined that the measurement result usability condition is met (YES at step S82), the CPU 351 proceeds to step S84.

At step S84, the CPU 351 performs a process similar to that at step S80, aside from restricting the trajectory length of the positioning trajectory used to calculate the degree of coincidence with the reference trajectory to the applicable trajectory length.

<Effects>

According to the present embodiment, the following effect can be achieved in addition the above-described effects according to the first embodiment.

According to the present embodiment, unnecessary processing (generation of the coincidence distribution and positioning information) can be suppressed when the measurement result usability condition is not met, or in other words, when the probability is high that positioning information having low reliability has been generated.

According to the present embodiment, minimum reliability of the generated positioning information can be ensured as a result of the applicable trajectory length k being designated. Therefore, step S90 and step S100 may be omitted.

Third Embodiment

The basic configuration according to a third embodiment is similar to that according to the first embodiment. Therefore, descriptions of common configurations are omitted. Differences will mainly be described.

According to the above-described first embodiment, the communication areas of the reference stations 2 do not overlap. Communication is possible with only a single reference station 2 on a single designated path.

Figure 13:
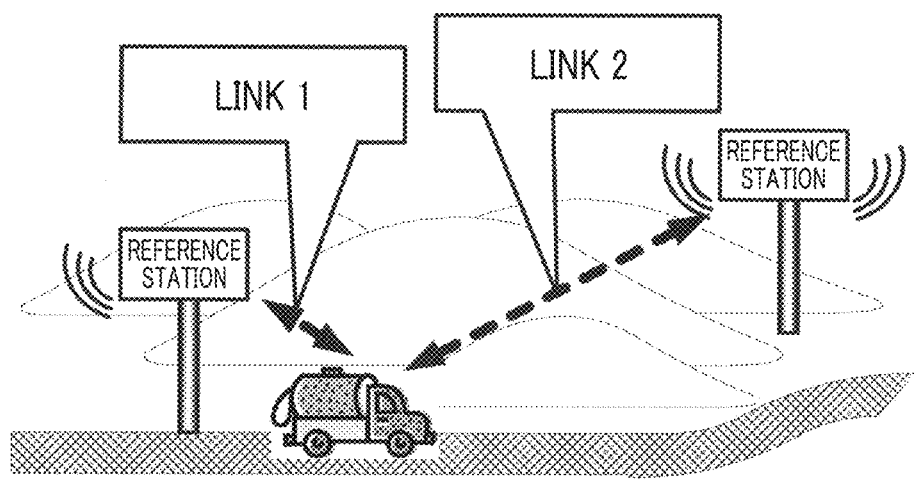
FIG. 13 is an explanatory diagram of an example of a plurality of wireless links according to a third embodiment.

Conversely, the present embodiment differs from the first embodiment in that, as shown in FIG. 13, the reference stations 2 are disposed so as to enable communication with a plurality of reference stations 2 on a single designated path. In addition, in the position estimation process performed by the on-vehicle apparatus 3, positioning information is generated for the plurality of reference stations 2 using the positioning trajectories respectively generated by the plurality of reference stations 2.

<Position Estimation Process>

Figure 6:
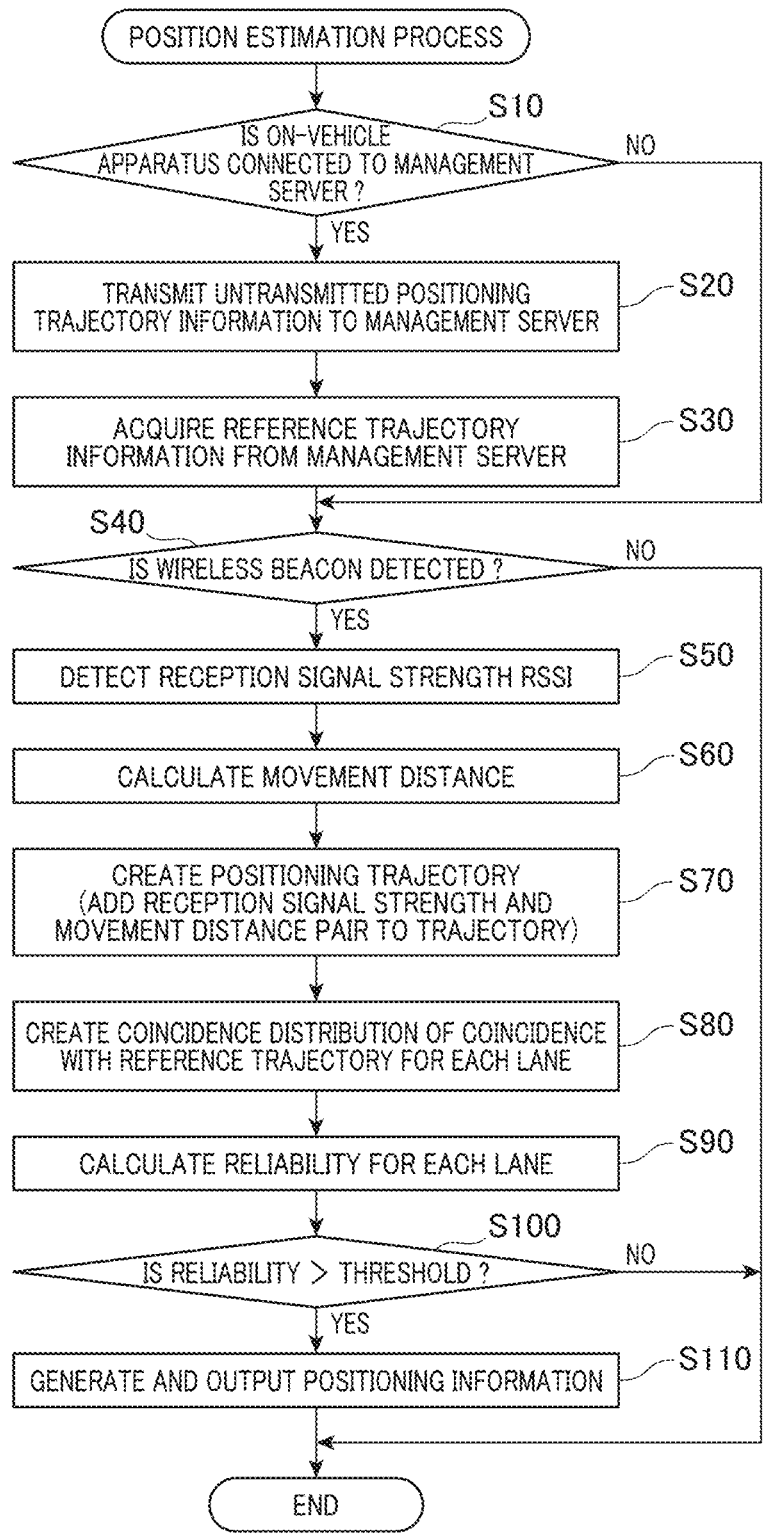
FIG. 6 is a flowchart of a position estimation process performed by the on-vehicle apparatus.

The position estimation process according to the present embodiment is substantially similar to that of which the details are described in FIG. 6. Only the differences will be described with reference to FIG. 6.

In other words, according to the present embodiment, the processes at step S70 and step S80 are performed for each type of identification information extracted from the wireless beacon, or in other words, for each communicable reference station 2. Hereafter, communication that is identified as being separate is referred to as a wireless link.

Figure 14:
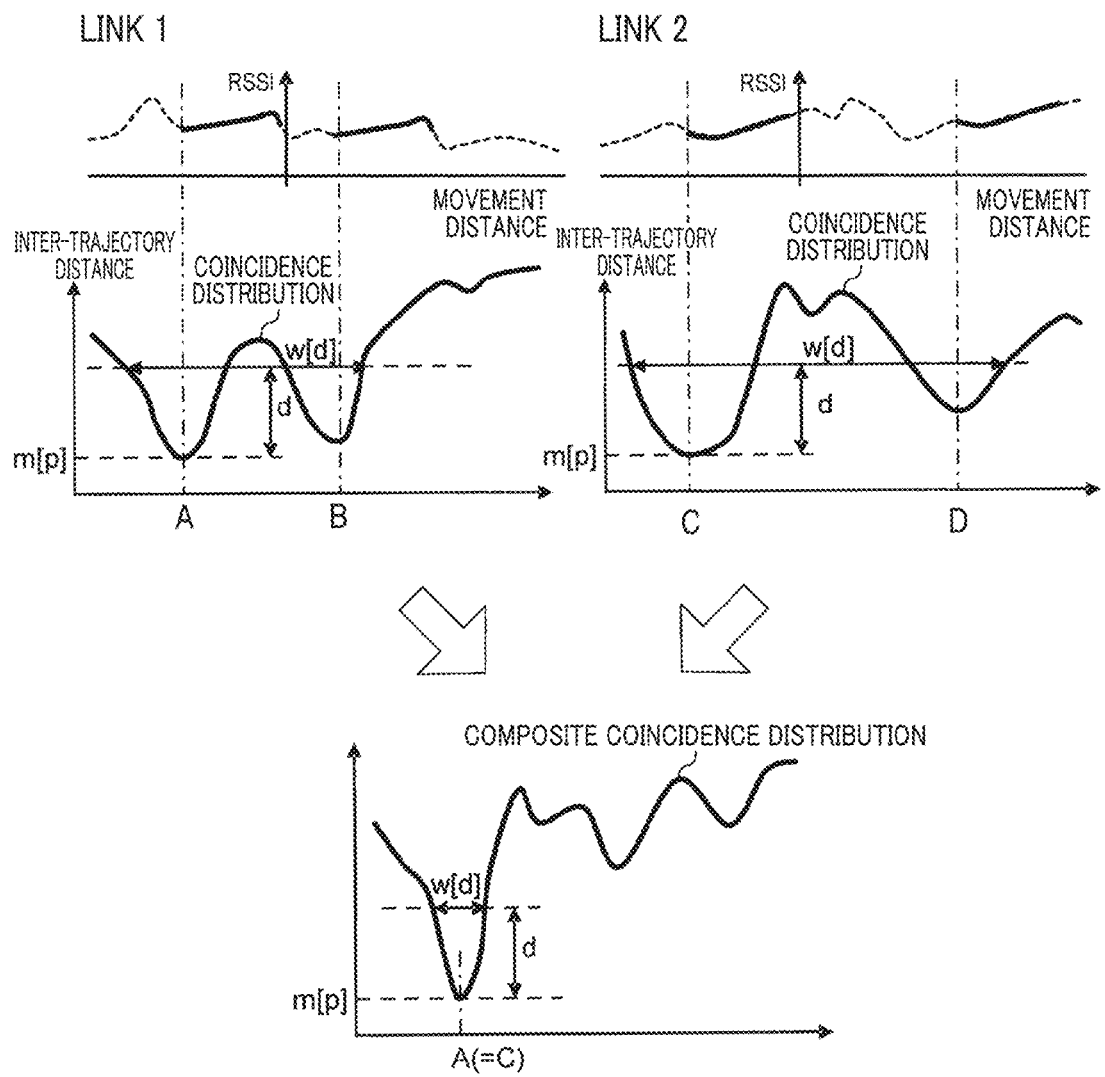
FIG. 14 is an explanatory diagram of a method for generating a composite coincidence distribution.

As shown in FIG. 14, at step S90, the CPU 351 generates a composite coincidence distribution based on the coincidence distribution generated for each wireless link at step S80 using the positioning trajectory generated for each wireless link at step S70. The composite coincidence distribution is a composite of the coincidence distributions generated for the wireless links. Reliability is calculated using the composite coincidence distribution. Specifically, compositing the coincidence distributions is actualized by multiplying or adding values indicating the degree of coincidence (such as the inter-trajectory distance) with one another.

<Effects>

According to the present embodiment, the following effects can be achieved in addition the above-described effects according to the first embodiment.

In other words, according to the present embodiment, the positioning information and reliability are determined using the composite coincidence distribution that is a composite of the coincidence distributions respectively generated for the plurality of wireless links. Therefore, the reliability of the positioning information can be increased. In addition, when reliability to a degree similar to that according to the first and second embodiments is to be achieved, the trajectory length of the positioning trajectory can be further shortened. Highly reliable positioning information can be acquired at an early timing.

Other Embodiments

The embodiments of the present invention are described above. However, the present invention is not limited to the above-described embodiments. It goes without saying that various aspects can be implemented.

(1) According to the above-described embodiments, the base point is used as a feature point. However, this is not limited thereto.

Figure 15:
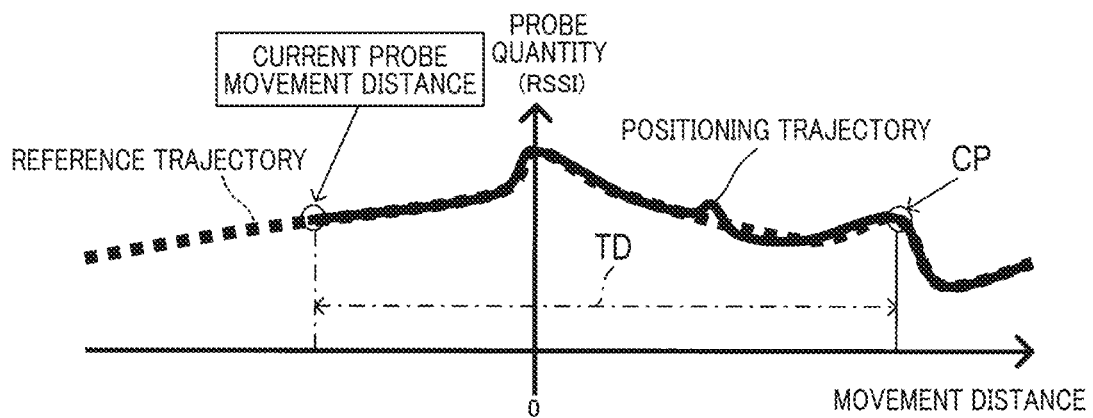
FIG. 15 is an explanatory diagram of a method for calculating positioning coordinates using feature points other than a base point.

For example, a local maximum point or a local minimum point within the coincidence distribution may be used. In this instance, when calculating the positioning coordinates at step S110, instead of the coordinates on the designated path corresponding to the base point and the movement distance from the base point, coordinates on the designated path corresponding to a feature point (a local maximum point in FIG. 15) CP and a movement distance TD from the feature point CP may be used, as shown in FIG. 15.

(2) According to the above-described third embodiment, a plurality of wireless links are actualized by communication with differing reference stations 2. However, this is not limited thereto.

Figure 16:
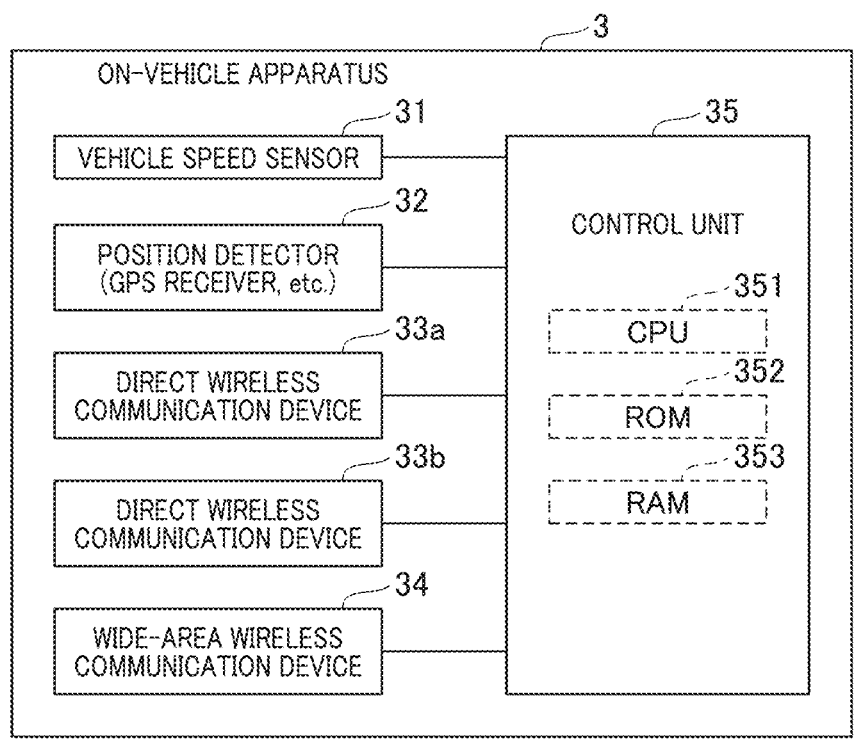
FIG. 16 is a block diagram of an example of a configuration of an on-vehicle vehicle as an example for actualizing a plurality of wireless links.

For example, as shown in FIG. 16, the on-vehicle apparatus 3 may include a plurality of direct wireless communication devices 33a and 33b. The direct wireless communication devices 33a and 33b perform reception using separate reception antennas. As a result, even when only a single communicable reference station 2 is present, communication by the direct wireless communication devices 33a and 33b may be handled as separate wireless links. In addition, the plurality of wireless links may be achieved by using a plurality of communication channels formed by frequency division or space division.

(3) Each constituent element of the present invention is conceptual and is not limited to the above-described embodiments.

For example, functions provided by a single constituent element may be dispersed among a plurality of constituent elements. Alternatively, functions provided by a plurality of constituent elements may be integrated in a single constituent element. In addition, at least some of the configurations according to the above-described embodiments may be replaced with known configurations providing similar functions. In addition, at least some of the configurations according to an above-described embodiment may be added to or substituted for configurations according to another of the above-described embodiment.

What is claimed is:

1. A wireless positioning apparatus mounted to a moving body, the wireless positioning apparatus comprising:
    a reference trajectory storage that stores therein feature point position information which is expressed in a positioning coordinate system, the feature point position information including: i) a reference trajectory that indicates a correspondence relationship between a position on a predetermined designated path and a reception state of transmitted waves from a wireless transmitter installed such that a communication area of the wireless transmitter includes the designated path; and ii) a position on the designated path that corresponds to one or more feature points present on the reference trajectory, and
    a processor, the processor is configured to:
        detect a reception state of transmitted waves from the wireless transmitter;
        measure a movement distance of the moving body;
        generate a positioning trajectory indicating a correspondence relationship between the movement distance measured and the reception state of transmitted waves detected;
        (i) determine a degree of coincidence between the positioning trajectory and the reference trajectory for each coordinate shift value which is equally added to positions of the movement distance in the positioning trajectory so as to be related to positions on the designated path of the reference trajectory; and
        ii) generate a coincidence distribution that indicates a correspondence between: a) a point on the reference trajectory to which a representative position, set arbitrarily within the positioning trajectory, corresponds for each coordinate shift value; and b) the degree of coincidence between the reference trajectory and the positioning trajectory,
        generate positioning information corresponding to the representative position, based on: i) the feature point position information; and ii) a positional difference on the designated path between an arbitrary feature point and a maximum coincidence point that is a point in the coincidence distribution at which the degree of coincidence is the highest; and
        determine a, reliability serving as a determination criterion for determining whether or not the positioning information is to be used, based on an evaluation value which is a value reflecting a flatness of the coincidence distribution.

2. The wireless positioning apparatus according to claim 1, wherein the processor is further configured to:
    use, as the evaluation value, at least one of: i) a maximum value of the degree of coincidence in the coincidence distribution; and ii) a maximum value of a distance between a point at which the degree of coincidence is the maximum value and a point at which a difference with or a ratio to the maximum value of the degree of coincidence is below a predetermined upper limit value.

3. The wireless positioning apparatus according to claim 2, wherein the processor is further configured to:
    generate the coincidence distribution when a trajectory length of the positioning trajectory generated by the positioning trajectory generator satisfies a predetermined usability condition.

4. The wireless positioning apparatus according to claim 3, wherein
    the usability condition is a condition that the trajectory length of the positioning trajectory is equal to or longer than an applicable trajectory length which is a trajectory length of a partial trajectory selected from the reference trajectory at which the reliability, determined by the reference trajectory and the partial trajectory, is equal to or larger than a predetermined required value.

5. The wireless positioning apparatus according to claim 4, wherein the processor is further configured to:
    detect, the reception state of transmitted waves for each wireless link of a plurality of wireless links;
    generate the position information for each wireless link;
    generate the coincidence distribution for each wireless link; and
    calculate the reliability based on a composite coincidence distribution that is a composite of coincidence distributions generated for each wireless link.

6. The wireless positioning apparatus according to claim 5, wherein the processor is further configured to:
    detect the reception state of the transmitted waves for the plurality of wireless links which receive a plurality of identifiable waves transmitted from a plurality of different wireless transmitters.

7. The wireless positioning apparatus according to claim 5, wherein the processor is further configured to:
    detect the reception state of the transmitted waves for the plurality of wireless links which receive, at a plurality of reception antennas that are installed at different locations, transmitted waves that are transmitted from the same wireless transmitter.

8. The wireless positioning apparatus according to claim 5, wherein the processor is further configured to:
    detect the reception state of the transmitted waves for the plurality of wireless links which receive, for each channel, transmitted waves that are transmitted from the same wireless transmitter using a plurality of channels.

9. The wireless positioning apparatus according to claim 5, wherein the processor is further configured to
    determine the composite coincidence distribution by multiplying or adding the coincidence distributions, generated for each wireless link, with one another.

10. The wireless positioning apparatus according to claim 1, wherein the processor is further configured to:
    generate the coincidence distribution when a trajectory length of the positioning trajectory generated by the positioning trajectory generator satisfies a predetermined usability condition.

11. The wireless positioning apparatus according to claim 1, wherein the processor is further configured to:
    detect the reception state of transmitted waves for each wireless link of a plurality of wireless links;
    generate the positioning information for each wireless link;
    generate the coincidence distribution for each wireless link;

determine the reliability based on a composite coincidence distribution that is a composite of coincidence distributions generated for each wireless link.

12. A wireless positioning method comprising: storing, in a reference trajectory storage provided in a wireless positioning apparatus mounted to a moving body, by a processor provided in the wireless positioning apparatus, feature point position information which is expressed in a positioning coordinate system, the feature point position information including: i) a reference trajectory that indicates a correspondence relationship between a position on a predetermined designated path and a reception state of transmitted waves from a wireless transmitter installed such that a communication area of the wireless transmitter includes the designated path; and ii) a position on the designated path that corresponds to one or more feature points present on the reference trajectory, detecting the reception state of transmitted waves from the wireless transmitter;

measuring a movement distance of the moving body;

generating a positioning trajectory indicating a correspondence relationship between the movement distance measured and the reception state of transmitted waves;

determining a degree of coincidence between the positioning trajectory and the reference trajectory for each coordinate shift value which is equally added to positions of the movement distance in the positioning trajectory so as to be related to positions on the designated path of the reference trajectory;

generating a coincidence distribution that indicates a correspondence between: a) a point on the reference trajectory to which a representative position, set arbitrarily within the positioning trajectory, corresponds for each coordinate shift value; and b) the degree of coincidence between the reference trajectory and the positioning trajectory;

generating positioning apparatus, positioning information corresponding to the representative position, based on: i) the feature point position information; and ii) a positional difference on the designated path between an arbitrary feature point and a maximum coincidence point that is a point in the coincidence distribution at which the degree of coincidence is the highest;

and determining reliability serving as a determination criterion for determining whether or not the positioning information is to be used, based on an evaluation value which is a value reflecting a flatness of the coincidence distribution.

* * * * *